(No Model.)
F. STARK.
SIPHONING APPARATUS.
No. 452,586. Patented May 19, 1891.
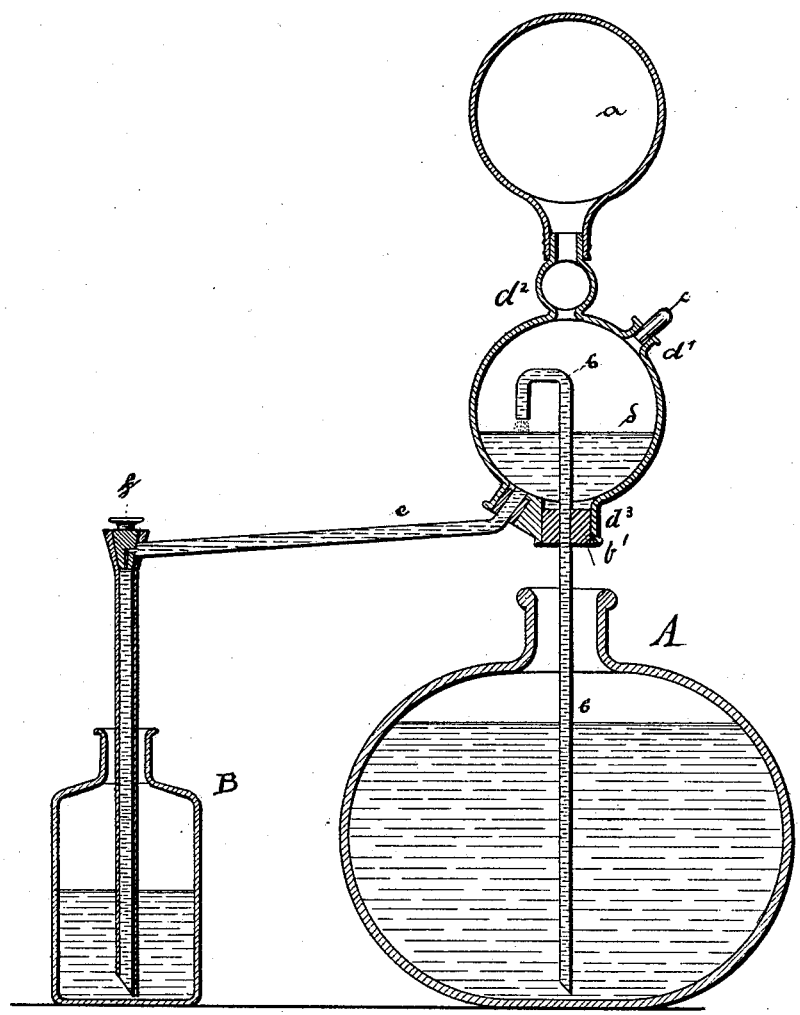
WITNESSES:
INVENTOR
Ferdinand Stark
BY
ATTORNEYS.

UNITED STATES PATENT OFFICE.

FERDINAND STARK, OF LUDWIGSHAFEN, GERMANY.

SIPHONING APPARATUS.

SPECIFICATION forming part of Letters Patent No. 452,586, dated May 19, 1891.

Application filed March 9, 1891. Serial No. 384,189. (No model.)

*To all whom it may concern:*

Be it known that I, FERDINAND STARK, a subject of the Emperor of Germany, and a resident of Ludwigshafen, Germany, have invented certain new and useful Improvements in Siphoning Apparatus, of which the following is a specification.

The object of my invention is to provide a new and improved apparatus for withdrawing liquids from casks, carboys, &c., into other receptacles.

The invention consists of a hollow vessel connected at its upper end with a compressible bulb, a tube projecting through the bottom of said vessel, and an outlet-tube extending from the bottom of the vessel and having a cock, the said vessel having a neck that can be closed by a stopper.

In the accompanying drawing a vertical longitudinal sectional view of my improved device for drawing liquids from casks, carboys, &c., is shown as used for drawing liquid from a carboy into a bottle.

A hollow vessel $d$ is provided with a neck $d'$ near its top, which neck can be closed by a stopper $c$. It is also provided with a top neck $d^2$, upon which a rubber ball $a$ is applied. A pipe $b$, having its upper end bent downward, passes through a stopper $b'$ in the bottom neck $d^3$ of the vessel $d$, said pipe $b$ being adapted to be passed into a carboy that is to be discharged. A bent outlet-tube $e$ is connected with the bottom of the vessel $d$, and is provided at its angle with a cock $f$. Said outlet-tube $e$ may be replaced by a rubber tube, in which case the cock $f$ may be replaced by a suitable device for compressing said rubber tube.

The apparatus is used in the following manner: The pipe $b$ is placed into the carboy A or other vessel to be emptied, and the lower end of the outlet-tube $e$ is placed into the bottle B to be filled. The neck $d'$ is closed, and by compressing a rubber ball $a$ one or more times air is withdrawn from the vessel $d$, whereupon the liquid passes from the carboy A through the pipe $b$ into the vessel $d$ until said vessel $d$ is filled up to the upper outlet of said tube $b$. Then the stopper $c$ is removed until the liquid in the vessel $d$ is at rest, whereupon said stopper $c$ is replaced. The cock $f$ is then opened and the liquid begins to flow through the outlet-pipe $e$ into the bottle, the liquid rising as rapidly through the pipe $b$ into the vessel $d$ as it is discharged through the pipe $e$ from said vessel $d$. To interrupt the flow of liquid, it is only necessary to remove the stopper $c$.

My improved apparatus can be made of glass, porcelain, iron, clay, &c.

Having thus described my invention, I claim as new and desire to secure by Letters Patent—

An apparatus for drawing liquids from casks, carboys, &c., consisting of a hollow vessel connected at its upper end with a compressible bulb, a tube projecting through the bottom of said vessel, an outlet-tube extending from the bottom of the vessel and having a cock and a neck in the top of said vessel, which neck can be closed by a suitable stopper, substantially as herein described.

In testimony that I claim the foregoing as my invention I have signed my name in presence of two subscribing witnesses.

FERDINAND STARK.

Witnesses:
GUSTAV REISENRT,
    *Of Ludwigshafen.*
R. H. GROPP,
    *Of Mannheim.*